United States Patent
Hernandez-Maldonado et al.

(10) Patent No.: US 10,086,359 B1
(45) Date of Patent: Oct. 2, 2018

(54) ADSORPTION MATERIAL FOR REMOVING CHEMICAL COMPOUNDS FROM WATER AND METHOD OF MAKING THE SAME

(75) Inventors: Arturo Hernandez-Maldonado, Mayaguez, PR (US); Sandra Mendez-Gonzalez, Powder Springs, GA (US); Sindia Rivera-Jimenez, Mayaguez, PR (US)

(73) Assignee: University of Puerto Rico, San Juan, PR (US)

( * ) Notice: Subject to any disclaimer, the term of this patent is extended or adjusted under 35 U.S.C. 154(b) by 0 days.

(21) Appl. No.: 13/071,178

(22) Filed: Mar. 24, 2011

Related U.S. Application Data

(60) Provisional application No. 61/316,924, filed on Mar. 24, 2010.

(51) Int. Cl.
  *B01J 20/22* (2006.01)
  *B01J 20/28* (2006.01)
  *B01J 20/10* (2006.01)

(52) U.S. Cl.
  CPC ............ *B01J 20/223* (2013.01); *B01J 20/10* (2013.01); *B01J 20/28054* (2013.01)

(58) Field of Classification Search
  USPC .......................................... 502/407; 423/335
  See application file for complete search history.

(56) References Cited

PUBLICATIONS

Tu et al., Factors influencing the catalytic activity of SBA-15-supported copper nanoparticles in CO oxidation, 2006, Applied Catalysis A: General, 297, 40-47.*
Rivera-Jimenez et al (Nickel(II) grafted MCM-41: A novel sorbent for the removal of Naproxen from water, Micro and Meso Mat. 116 (2008) 246-252).*
Bui et al(Adsorptive removal of selected pharmaceuticals by mesoporous silica SBA-15, J Hazard Mat. 168 (2009) 602-608).*

* cited by examiner

*Primary Examiner* — Melvin C. Mayes
*Assistant Examiner* — Michael Forrest
(74) *Attorney, Agent, or Firm* — Hoglund & Pamias, PSC; Robert J. Rios

(57) ABSTRACT

The invention provides the incorporation of $Co^{2+}$, $Ni^{2+}$ or $Cu^{2+}$ onto the surface of mesoporous SBA-15 via an amino-organic grafting method and the screening of materials as sorbents for the removal of Naproxen from water.

1 Claim, 9 Drawing Sheets

ADSORPTION MATERIAL FOR REMOVING CHEMICAL COMPOUNDS FROM WATER AND METHOD OF MAKING THE SAME

GOVERNMENT INTEREST

The claimed invention was made with U.S. Government support under grant number CBET-0546370 awarded by the US National Science Foundation (NSF). The government has certain rights in this invention.

BACKGROUND OF THE INVENTION

Recent reports have recognized that the occurrence, fate, and treatment of Pharmaceutical and Personal Care Products (PPCPs) in the environment are of increasing global concern. These so called "emerging contaminants" were actually first identified in the early 1980s and include a wide rage of chemicals such as analgesics (naproxen, acetaminophen, and ibuprofen), antibiotics (ciproflaxin, and triclosan), antihyperlipidemics (clofibric acid), and other compounds (bisphenol, salicylic acid, and carbamazepine). During decades, they have shown to be persistent in the environment probably due to long-shelf life formulations associated with product demand of a continuously growing population. Moreover, traditional water treatment methods are not suitable for the removal of PPCPs resulting in surface water concentrations in the parts-per-trillion (ppt) range. Although the ultimate impact of PPCPs on population health is still not fully understood, the removal of these contaminants from our potable water and aquatic systems is an important goal for worldwide government agencies and researchers.

Most PPCPs are polar compounds with acidic or basic functionalities that occur at low concentration levels in water sources. These characteristics generate unique challenges for their removal using traditional water treatment methods. Various sorbents have been proposed for the removal of a selected list of PPCPs at low concentrations. Examples of these include activated carbon, membranes, and polymers. In general, the corresponding uptake capacities of many of these materials showed to be highly dependent on pH conditions and specific interactions such as van der Waals, electrostatic, and dipole-dipole. Another study showed that the adsorption performance of silica, g-alumina and Parapak-P (non-polar organic medium) on selected PPCPs was also highly dependent on pH conditions, ionic level of the pharmaceutical, and the nature of the surface charge of the sorbents. To achieve better selectivity at the present and near future concentration levels it is critical to start considering the bottom-up design of surfaces with better specific interactions, tailored to remove specific families of PPCPs.

Mesoporous silica are good candidates for the design of PPCP selective sorbents due to their large surface areas, tunable pore structure and well understood surface chemistry. Since their discovery in 1992 mesoporous silicas from the M41S family have demonstrated their potential in applications like heavy metal and organic contaminants removal, catalysis, chromatographic separation, and controlled drug delivery. A recent report documents the use of nickel grafted on mesoporous support as a potential sorbent for the removal of Naproxen from water at ppm concentration levels. However, it was concluded that supports with better stability should be considered in order to increase the amount of metal incorporated onto the surface without compromising the structural and porosimetry properties. In addition, based on ab-initio calculations, the report suggested that the adsorption process could be described as a complexation mechanism between the metal center and the Naproxen molecule.

One possible way of reducing the grafting effects on the overall materials textural properties of mesoporous silica is by employing substrates that display dense pore walls. SBA-15 mesoporous silica are known to have thick pore walls (3.1-6.4 nm) and considerable pore diameters (4.6-30 nm), characteristics that are essential to facilitate the grafting while providing the required pore volume for the removal of large sorbates. It should be mentioned that recently it has been reported the use of unmodified mesoporous SBA-15 for the removal of a set of PPCPs. Although they showed that the materials performance was greatly dependent on pH, no attempt to modify the solid surface chemistry was made.

SUMMARY OF THE INVENTION

This invention provides a detailed description on the modification of SBA-15 mesoporous supports with cobalt (II), nickel(II), and copper(II) amine complexes, respectively. The materials chemical and textural properties have been thoroughly evaluated and carefully considered during the analysis of single point adsorption tests for the removal of naproxen from water. The invention describes the effect of solution pH on the naproxen uptake as well as its use as plausible sorbent regeneration strategy.

BRIEF DESCRIPTION OF THE DRAWINGS

Further features and advantages of the invention will become apparent from the following detailed description taken in conjunction with the accompanying figures showing illustrative embodiments of the invention, in which.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

Experimental Section

Reagent and Materials

The following reagents were used for the synthesis and surface modification of SBA-15: Pluronic P123 Surfactant, hydrochloric acid (HCl, 37 wt %, ACS Reagent), tetraethyl orthosilicate (TEOS 98-wt %), toluene (anhydrous, 99.8%), ethanol, (denaturized), cobalt(II) sulfate heptahydrate (99%), nickel(II) sulfate hexahydrate (Puris Reagent ACS), copper(II) sulfate pentahydrate (98%, ACS reagent), dimethyldichlorosilane (DMDCS, 99%), methanol (spectrophotometric grade, 99%). In addition, sodium hydroxide (Sigma ultra, 98%) and Naproxen (98%) were used for the adsorption experiments. Prior to use, all water was thoroughly distilled and deionized.

Synthesis of Pure Siliceous Mesoporous SBA-15

Pure siliceous SBA-15 was synthesized using a scaled up version of the recipe previously reported by Stucky and coworkers. Relative large amounts of the SBA-15 were necessary for the modification, characterization and adsorption routines. In a typical synthesis, 8.0 g of Pluronic P123 were dissolved at 35° C. in 60 ml of water and 240 g of a 2M HCl solution under moderate stirring. After the polymer was dissolved, 18.2 ml of TEOS were added drop wise into the stirring solution and left to stir at 35° C. for 20 h. The resulting slurry mixture was then transferred into a Teflon lined stainless-steel reactor and then sealed and heated to 100° C. for 24 hr under static and autogenous pressure conditions. The final solid material was recovered by filtration and washed with copious amounts of water. The recovered solid cake was dried in a forced convection oven overnight at 60° C. The surfactant template molecules inside the pores of the mesoporous material were removed via calcination with air at 500° C. for 6 hrs. For nomenclature purposes, the resulting material was simply denominated SBA-15.

Preparation of Metal Modified Mesoporous Silica

Figure 7:
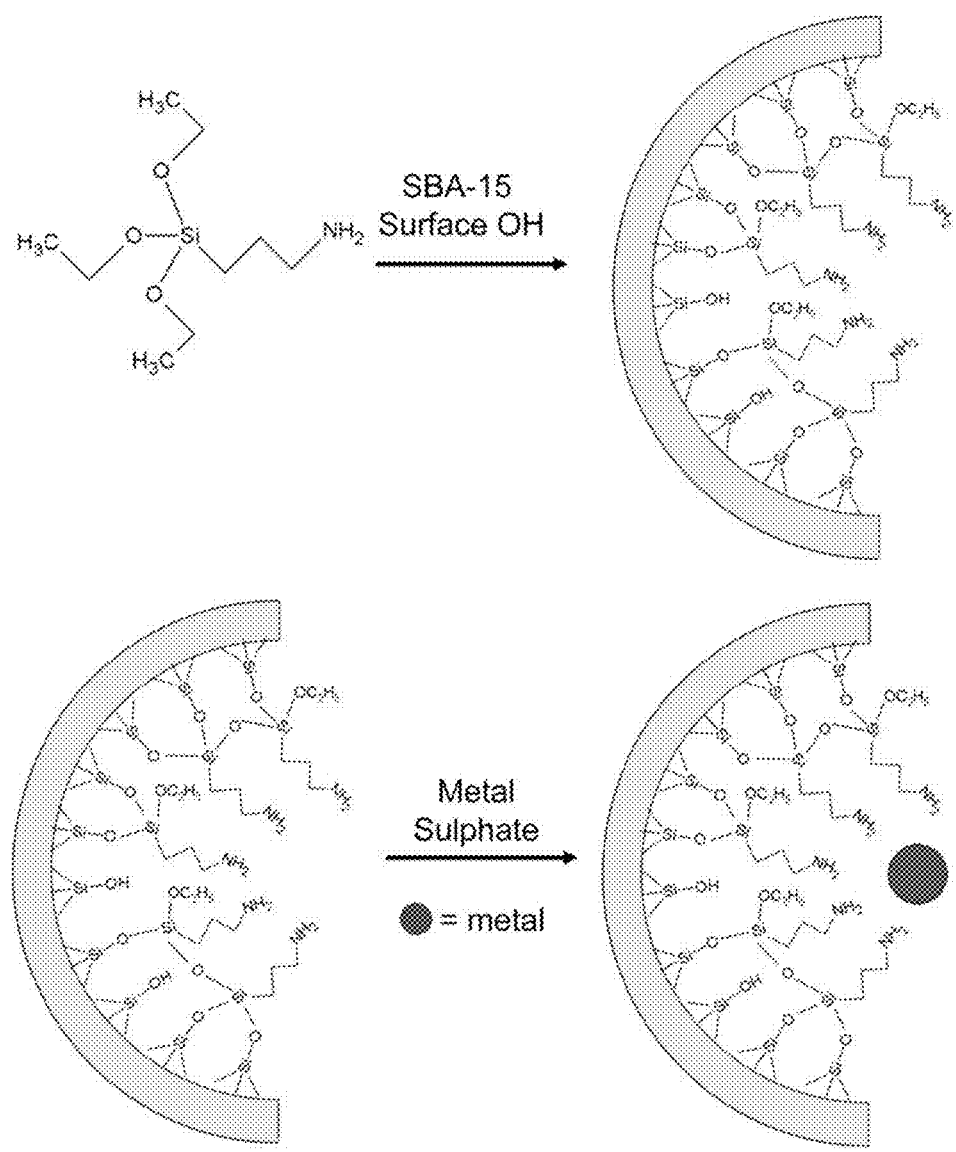
FIG. 7 illustrates a scheme for the modification of SBA-15 done in a step-wise fashion using grafting techniques according to the present invention.

The modification of SBA-15 was done in a step-wise fashion using grafting techniques as illustrated in FIG. 7. First, for the chemical incorporation of amino-organic moieties, 2 g of SBA-15 (BET $S_A \sim 800$ m$^2$/g) were pretreated at 150° C. for 2 hours in a nitrogen atmosphere to remove physisorbed water. After the solid was brought to room temperature under nitrogen, it was suspended in 400 ml of dry toluene and stirred for approximately 30 min. An excess amount of 3-aminopropyltriethoxysilane in 80 ml toluene was added drop-wise to the slurry and stirred under reflux at 100° C. for 24 hrs. The material was filtered, washed with dry toluene followed by ethanol, and Soxhlet-extracted using a mixture of 100 ml of diethyl ether and 100 ml dichloromethane for 24 hrs. Finally, for the immobilization of metal complexes 1.5 g of amino-organic functionalized silica was mixed with a 0.02 M alcoholic solution of the corresponding $M^{2+}$ sulfate (M=Co$^{2+}$, Ni$^{2+}$, and Cu$^{2+}$) for 18 hrs at 60° C. also under nitrogen atmosphere. The mixture was filtered, washed with copious amounts of ethanol and then Soxhlet-extracted with ethanol for 12 hrs. The materials were dried overnight in a forced convection oven at 60° C.

All materials were pretreated before characterization and adsorption experiments to remove traces of sulfates and to promote final anchoring of the metal to the amino-organic moieties. This pretreatment was achieved by washing 1 g of the metal modified materials with 500 ml of a NaOH solution (pH=12). The materials were let to dry at 60° C. for at least 1 hr and were denominated CoNH$_2$_g_SBA-15, NiNH$_2$_g_SBA-15, and CuNH$_2$_g_SBA-15, respectively. It is important to note that each metal modified material showed a characteristic color depending on the type of metal incorporated. It is common for metal ions of d-block family to form complexes that are associated with a change in color and sometimes a change in the intensity of color. Table 1 below summarizes the color changes of the metal modified materials and the suggested structured based on the color changes after pretreatment.

TABLE 1

Suggested metal coordination structure based on observed color changes.
†Color observed under white fluoresce light and white background.

| Sample | Before Pre-treatment | After Pre-treatment | After adsorption experiment | Suggested Structure |
|---|---|---|---|---|
| SBA-15 | White | White | White | — |
| CoNH$_2$_g_SBA-15 | Mix of yellowish brow and light blue | No noticeable changes | No noticeable changes | 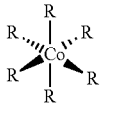 Yellowish-brown <br> Light blue |
| NiNH$_2$_g_SBA-15 | Light green | Intense light green | No noticeable changes | 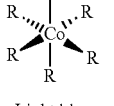 |
| CuNH$_2$_g_SBA-15 | Light blue | Intense light blue | Royal blue | 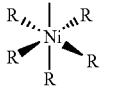 |

Characterization

X-ray powder diffraction patterns were obtained using a Rigaku Ultima III diffractometer with Cu-k$_\alpha$ radiation ($\lambda$=1.5418 Å) and operating at 40 kV and 44 mA. All XRD patterns were collected in the 2θ range between 0.5° and 3° with a scanning rate of 0.01°/min. The textural properties of the samples were measured via nitrogen adsorption isotherms at −196° C. (77 K) using a Micromeritics ASAP 2020 volumetric porosimetry test instrument equipped with turbo-molecular drag pumps. Prior to each adsorption measurement, the SBA-15 and grafted samples were each degassed under vacuum for 5 hrs at 200° C. and 100° C., respectively. The total surface area $S_t$, external surface area $S_{ext}$, and primary mesopore volume $V_p$ of the samples were calculated using the $a_s$-plot method using a macroporous silica gel LiChrospher Si-1000 as a reference. Pore-Size Distributions (PSD) were calculated from the desorption branch of the N$_2$ isotherm data using the Barret-Joyner-Halenda (BJH) method applying the Kruk-Jaroniec-Sayari correction.

Images of the materials particles were obtained using a JEOL-JSM-6930 scanning electron microscope (SEM) operating with a secondary electron detector and an accelerating voltage of 15 kV. Energy Dispersive X-ray Analysis (EDX) was used to determine metal atomic ratios with respect to silica ($n_{Si}/n_{metal}$) and nitrogen ($n_N/n_{metal}$). The experiments were performed using the aforementioned SEM unit at an accelerating voltage of 10 kV and an EDX energy dispersive X-ray spectrometer. Calculations to analyze surface composition were done using the standardless quantification. Results are reported based on the average of six different randomly selected areas to ensure that the data collected was representative of the bulk sample.

FTIR spectra were obtained in a Nicolet 6700 FTIR instrument loaded with a Praying Matins attachment operated at ambient conditions. Powder samples were analyzed at 4 cm$^{-1}$ resolution and averaged over 400 scans in the absorption band range of 4000-400 cm$^{-1}$. All spectra were corrected for presence of humidity and carbon dioxide. Weigh loss profiles were obtained using a high resolution TA-Q500 thermogravimetric analyzer to quantify the amount of amino-organic moieties present on the metal (M=$Cu^{2+}$, $Ni^{2+}$, $Co^{2+}$) grafted mesoporous SBA-15. These experimental results were compared to theoretical values obtained assuming monolayer formation over the support surface. TGA measurements were performed under constant flow of air at 60 ml/min using platinum sample holders and a heating rate of 5° C./min from to 800° C. Air was pretreated using moisture and hydrocarbons traps to avoid sample contamination.

Adsorption Experiments

Single point adsorption experiments were carried out using a batch equilibrium technique previously described in the art. A typical uptake experiment was performed by combining a predetermine amount of the adsorbent with 15 ml solution containing an initial concentration of 14 ppm Naproxen in 25 ml Teflon bottles. All glassware used was previously deactivated using a 10% v/v solution of DMDCS in toluene, washed twice with methanol, and dried at room temperature for at least 1 hr. The pH of the initial solution used for the adsorption experiments was adjusted to 2, 7 or 13 using 1M HCL and 1M NaOH solutions without further adjustment after adding the sorbents. The mixtures were then placed in a constant temperature oscillation shaker (operated at 250 rpm) and allowed to equilibrate at room temperature for ca. 24 hrs. At the end of the adsorption experiment, the final slurry was centrifuged at 3,500 rpm and for 5 min. Triplicate measurements were taken of the remaining liquid phase to determine the equilibrium concentration, which was measured using a Shimadzu UV-2401 PC UV/Visible spectrophotometer at the corresponding characteristic wavelength of Naproxen. The adsorbed amount of Naproxen was calculated by concentration difference using the equation:

$$Q_e = \frac{(C_i - C_e) * V_i}{W_s * MW_{Napro}} * 10^{-3}$$

where $Q_e$ (mmol/g) is the adsorbed amount of Naproxen after equilibrium, $C_i$ (mg/L) is the initial concentration of Naproxen used, $C_e$ (mg/L) is the remaining concentration after equilibrium, $V_i$ (L) is the liquid volume of the batch, $W_s$ (g) is the mass of the adsorbent added, and $MW_{Napro}$ (mg/mmol) is the molecular weight of Naproxen.

Results and Discussion

Structure, Textural and Morphological Properties of Metal Grafted Mesoporous SBA-15.

Figure 1:
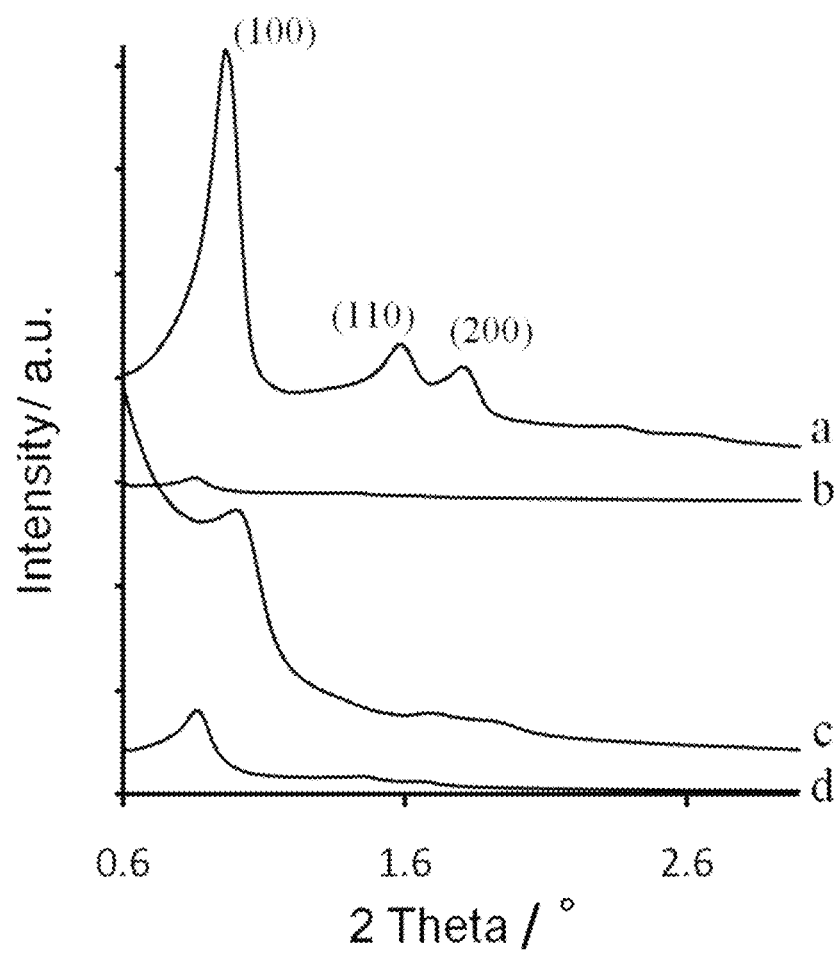
FIG. 1 shows plots of Powder XRD patterns according to the present invention.

Three transition metals were used for the modification of SBA-15 using the grafting technique. FIG. 1 compares the low angle XRD patters of SBA-15 samples before and after the incorporation of the metal. Unmodified SBA-15 exhibits three well-defined X-ray diffraction peaks, which can be indexed to the (100), (110), and (200) planes. These characteristic peaks suggest a p6 mm symmetry, typical of uniform mesopore structure with hexagonal long-range order. The corresponding $d_{100}$-spacing for the unmodified SBA-15 sample is 9.2 nm, which agrees well with the value reported elsewhere in the art. Three characteristic diffraction peaks are still present for the grafted NiNH$_2$_g_SBA-15 and Cu NH$_2$_g_SBA-15 samples, suggesting that the long-range hexagonal structure was preserved. However, an overall decrease in the diffraction peak intensities was observed after the incorporation of the metals. Previous studies suggest that this behavior could be attributed to a reduction in scattering power of the mesoporous walls due to the incorporation of amino-organic moieties inside the SBA-15 pores. Table 2 below shows d-spacing values for the SBA-15 and metal modified materials. In general, the incorporation of the metal and amino-organic moieties does not seem to considerably affect the interplanar spacing, with the exception of only a minor shift observed for the Ni-modified materials probably suggesting a pore size reduction.

TABLE 2

Textural and structural properties obtained from $N_2$ adsorption-desorption at 77K and X-ray diffraction data.

| Sample | $S_t$ (m$^2$/g) | $V_g$ (cm$^3$/g) | $D_p$ (nm) | $d_{100}$ (nm) |
|---|---|---|---|---|
| SBA-15 | 870 | 1.06 | 7.9 | 9.2 |
| CoNH$_2$_g_SBA-15 | 441 | 0.31 | 4.6/8.1 | 10.2 |
| NiNH$_2$_g_SBA-15 | 383 | 0.29 | 7.0 | 8.8 |
| CuNH$_2$_g_SBA-15 | 283 | 0.34 | 7.6 | 10.2 |

Figure 2:
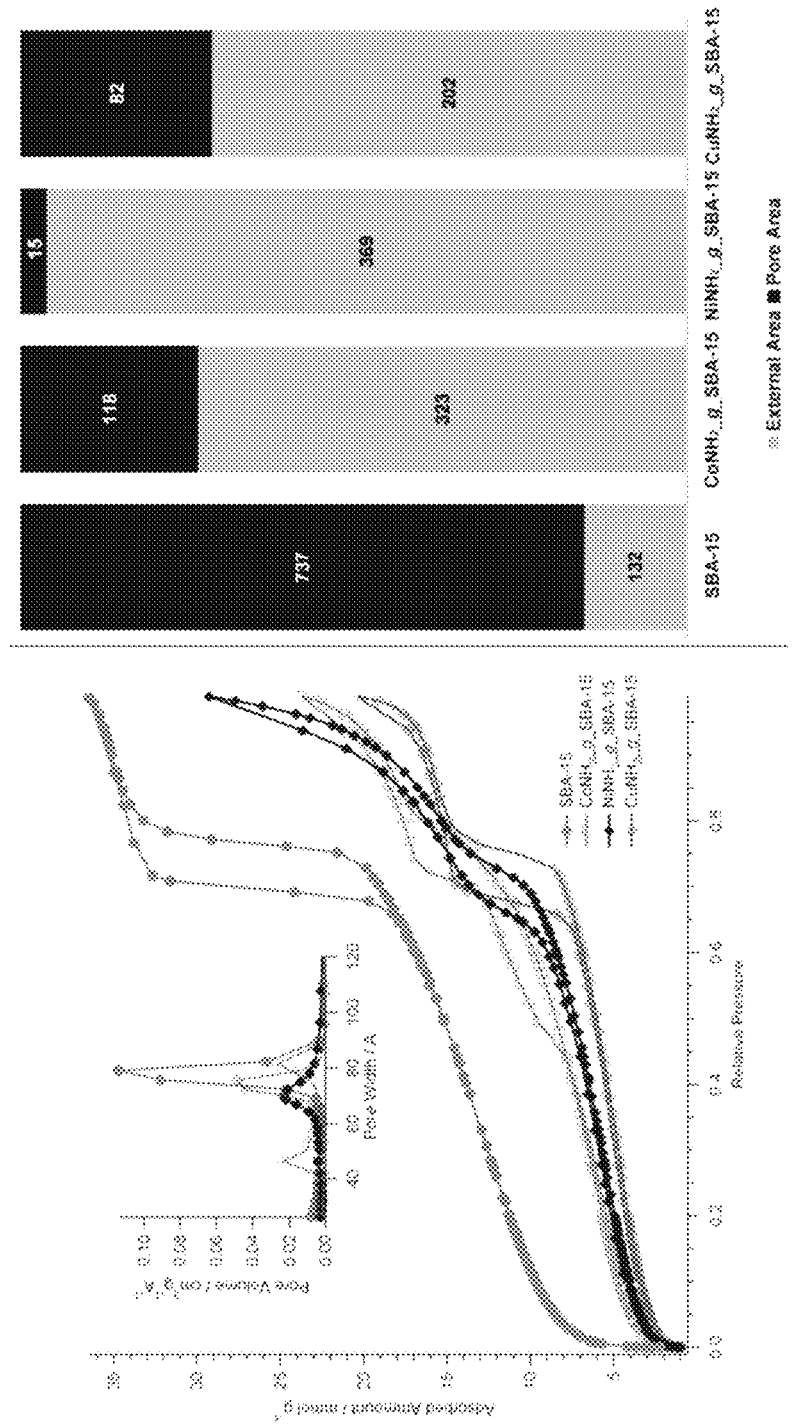
FIG. 2 shows plots of Nitrogen adsorption/desorption equilibrium isotherms at −196° C. and inset with PSD curves and External and pore surface area distribution according to the present invention.

The nitrogen adsorption-desorption isotherms for all samples are gathered in FIG. 2 and a summary of structural parameters are presented in Table 2. Most of the observed isotherms are of type IV with H2 hysteresis loops, which is typical of SBA-15 materials. The adsorption isotherm data for SBA-15 shows a relatively sharp increase at around $P/P_o$=0.77, suggesting capillary condensation of nitrogen inside a uniform mesopore structure and in agreement with the low-angle XRD pattern observations. Structural properties such as pore uniformity, high surface area (870 m$^2$/g), pore volume (1.06 cm$^3$/g), and pore entrance (9.2 nm) demonstrate that a neat mesoporous SBA-15 was successfully obtained using a scale-up synthesis version of the one previously reported by the art.

Figure 8:
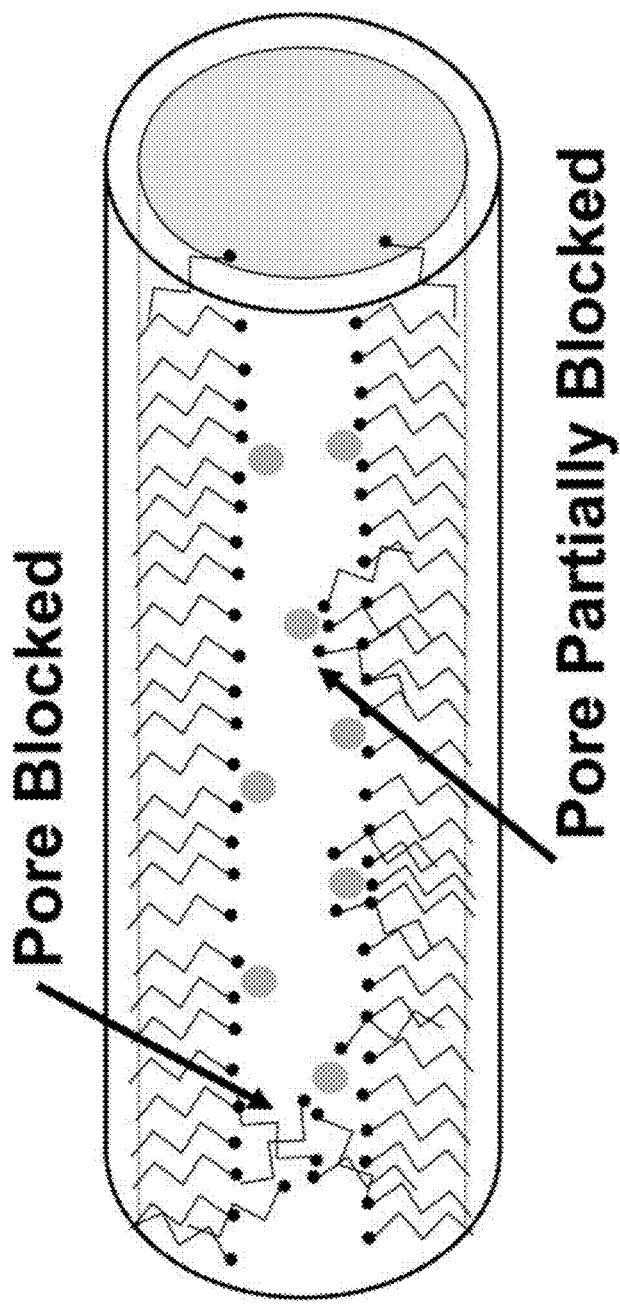
FIG. 8 illustrates a schematic representation of the pore blockage according to the present invention.
Figure 9:
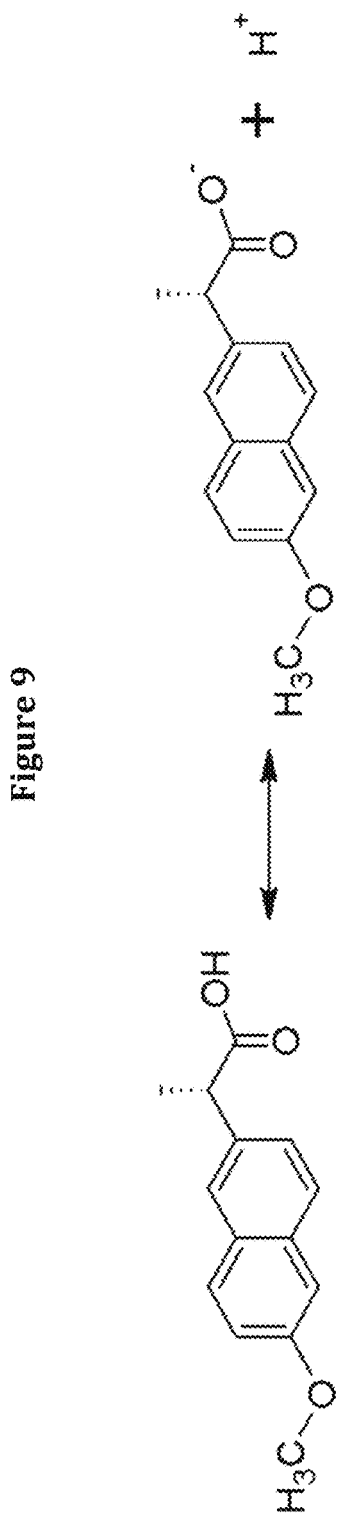
FIG. 9 shows molecule mostly present in solution in ionic form due to the loss of $H^+$, according to the present invention.

After modification of SBA-15 via the grafting method presented above, the isotherm inflections associated to hysteresis (see FIG. 2) shifted to lower relative pressures and the final volume of nitrogen adsorbed decreased. In addition, the total surface area estimated with the $a_s$-method (Table 2) decreased as follows CoNH$_2$_g_SBA-15>NiNH$_2$_g_SBA-15>CuNH$_2$_g_SBA-15. However, a comparison of the PSD curves for SBA-15 and the metal modified samples (FIG. 2) reveals that the grafting process does not have much influence on the pore entrance of the resulting material. FIG. 2 also shows the distribution of external and pore areas. The percentage of pore surface area available normalized by the total area of the corresponding material follows the order SBA-15>CuNH$_2$_g SBA-15>CoNH$_2$_g_SBA-15>NiNH$_2$_g_SBA-15. This observation may be attributed to partial blocking of the pore due to amino-organic moieties that may have been hydrolyzed among them instead of forming a single monolayer on the surface. A possible schematic representation of the pore blockage is shown in FIG. 8.

Decrease in textural properties is more evident in the NiNH$_2$_g_SBA-15 samples (FIG. 2 and Table 2) and this correlates well with the interplanar changes observed during XRD analysis, which denotes some structural collapsing. Meanwhile, the observed CoNH$_2$_g_SBA-15 sample porosimetry data yields a bimodal PSD with a minimal pore size of 4.6 nm, which is possibly attributed to the partial blocking of the pores. In spite of the observed changes in the textural properties, the changes of the overall shape of the adsorption/desorption isotherms and the presence of the inflection points in all samples also suggest that the metal and amino-organic groups were incorporated inside the pores and that most of the sorbents original structure order is still retained after modification. These observations correlate well with the general XRD findings.

Figure 3:
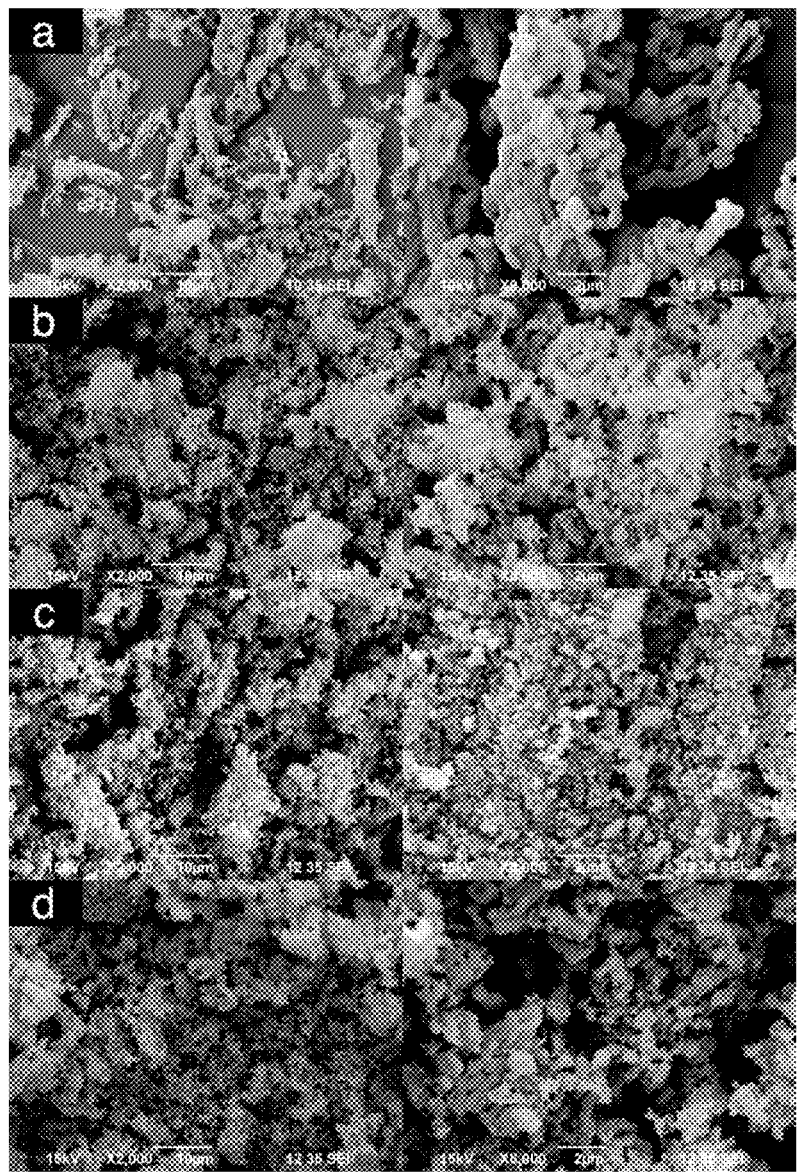
FIG. 3 shows SEM images of SBA-15 and modified SBA-15 according to the present invention.

FIG. 3 shows the SEM micrographs for all the samples at two different magnifications. In agreement with the results reported elsewhere, SBA-15 has the typical wheat-like morphology and consists of aggregates of uniform rope-like particles with a mean size of ca. 1 mm. After the metal grafting (FIGS. 3B-D), it can be observed that the macroscopic aggregates do resemble the typical wheat-like morphology, but with larger external area when compared to that of the unmodified SBA-15 sample. In addition, an overall decrease in the mean particle size is apparent at higher magnification possibly associated to the increase in external surface areas presented in FIG. 2. SEM images also show that both cobalt (FIG. 3B) and copper (FIG. 3D) modified materials still resemble rope-like particles. However, as shown in FIG. 3C, the NiNH$_2$_g_SBA-15 sample seems to be affected the most.

Composition of the Metal Grafted Mesoporous SBA-15.

EDX results are summarized in Table 3 below and where used to analyze the composition for SBA-15 and the variants in a semi-quantitative fashion. The metal loading on the siliceous SBA-15 was analyzed using the atomic ratio of the siliceous support over that of the metal. The atomic ratios for CoNH$_2$_g_SBA-15, NiNH$_2$_g_SBA-15, and CuNH$_2$_g_SBA-15 were 6.4, 6.3, and 3.5, respectively. In general, all modified materials appear to have being loaded with their corresponding metal, being CuNH$_2$_g_SBA-15 the one with the highest loading. To have insight on the possible stoichiometry between amino-organic groups and the metal loading, a molar ratio between atomic nitrogen and metal loaded was calculated. These ratios were 5.2, 5.7, and 4.9 for CoNH$_2$_g_SBA-15, NiNH$_2$_g_SBA-15, and CuNH$_2$_g_SBA-15, respectively.

TABLE 3

Compositional analysis obtained from TGA and EDX.

| Sample | NH$_2$ loading (mmol/g) | $\eta_{Si}/\eta_{metal}$ | $\eta_N/\eta_{metal}$ |
|---|---|---|---|
| SBA-15 | — | — | — |
| CoNH$_2$_g_SBA-15 | 2.12 | 6.4 | 5.2 |
| NiNH$_2$_g_SBA-15 | 1.96 | 6.3 | 5.7 |
| CuNH$_2$_g_SBA-15 | 2.50 | 3.5 | 4.9 |

The formation of metal complexes with amino-organic moieties is not necessary following a 1:1 stoichiometry. For instance, the results shown in Table 3 indicate that each metal center in the NiNH$_2$_g_SBA-15 sample is probably forming bonds with approximately six amino groups concurrently. This need of an additional amino-organic moiety may result in a partially or fully blocked pore therefore producing a decrease in pore volume (see Table 2).

Characterization of the Inorganic and Organic Moieties.

Figure 4:
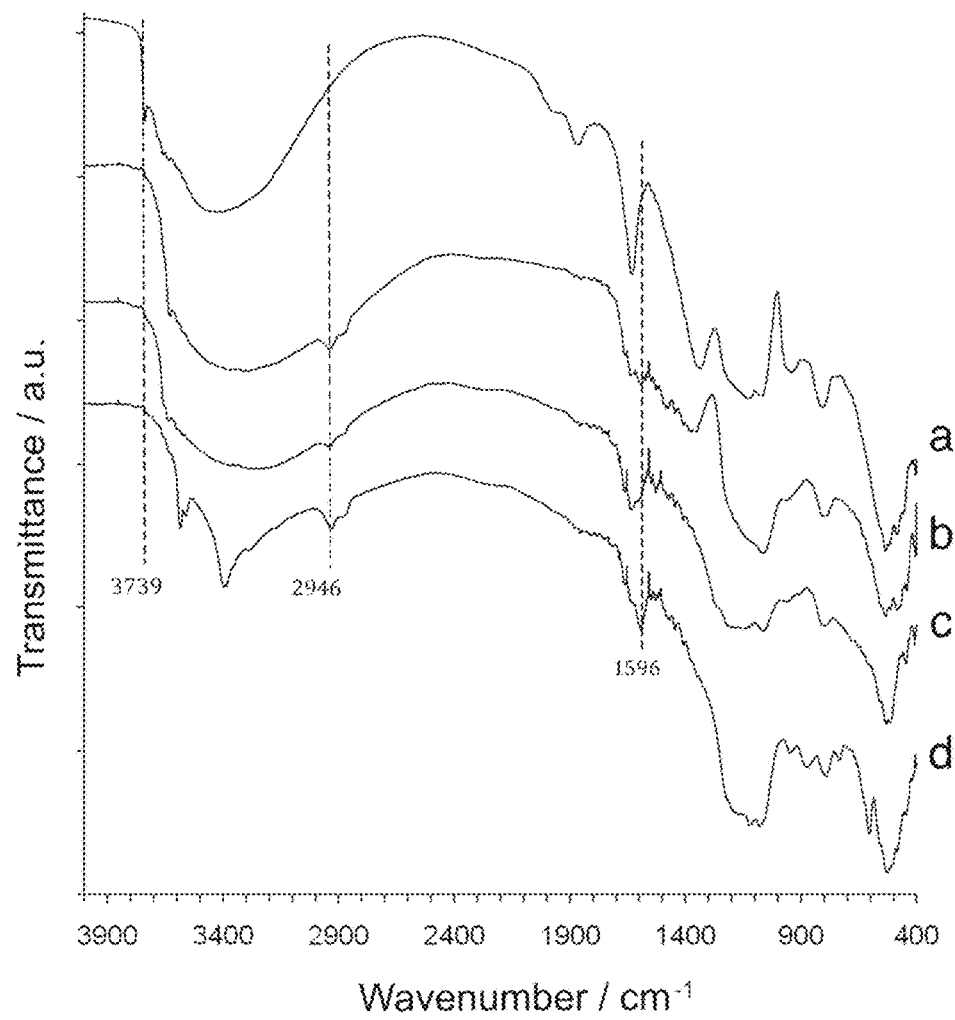
FIG. 4 shows FTIR spectra of SBA-15 and modified SBA-15 according to the present invention.

Infrared spectroscopy was used to characterize the support and the inorganic and organic moieties present in the solid samples after modification. FIG. 4 shows FTIR spectra for all the samples. For SBA-15, the bands at 1078, 821 and 968 cm$^{-1}$ may be attributed to the asymmetric Si—O—Si vibrations, symmetric vibrations on the surface, and Si—OH vibrations, respectively. In addition and the broad band in the 3700 to 3200 cm$^{-1}$ range suggests the presence of silanols associated with adsorbed water. After grafting, the intensity of the band associated with the single silanol groups at 975 cm$^{-1}$ and 3740 decreased and shifted to lower wavelength values suggesting the anchoring of the amino-organic moieties. In addition, after modification, the FTIR data shows weak bands at the 1550 to 1750 cm$^{-1}$ range that may be attributed to the different NH$_2$ vibrational modes. As reported before, the new bands that appeared between 3000 to 2800 cm$^{-1}$ and near 1150 cm$^{-1}$ can be assigned to both symmetric and asymmetric stretching of CH$_3$ and CH$_2$ groups. The effect on the incorporation of the metal groups can be observed by the shift to lower wavenumber values of the bands assigned to amine groups. These results once again confirm the modification of SBA-15 by amino-organic groups and metals.

Figure 5:
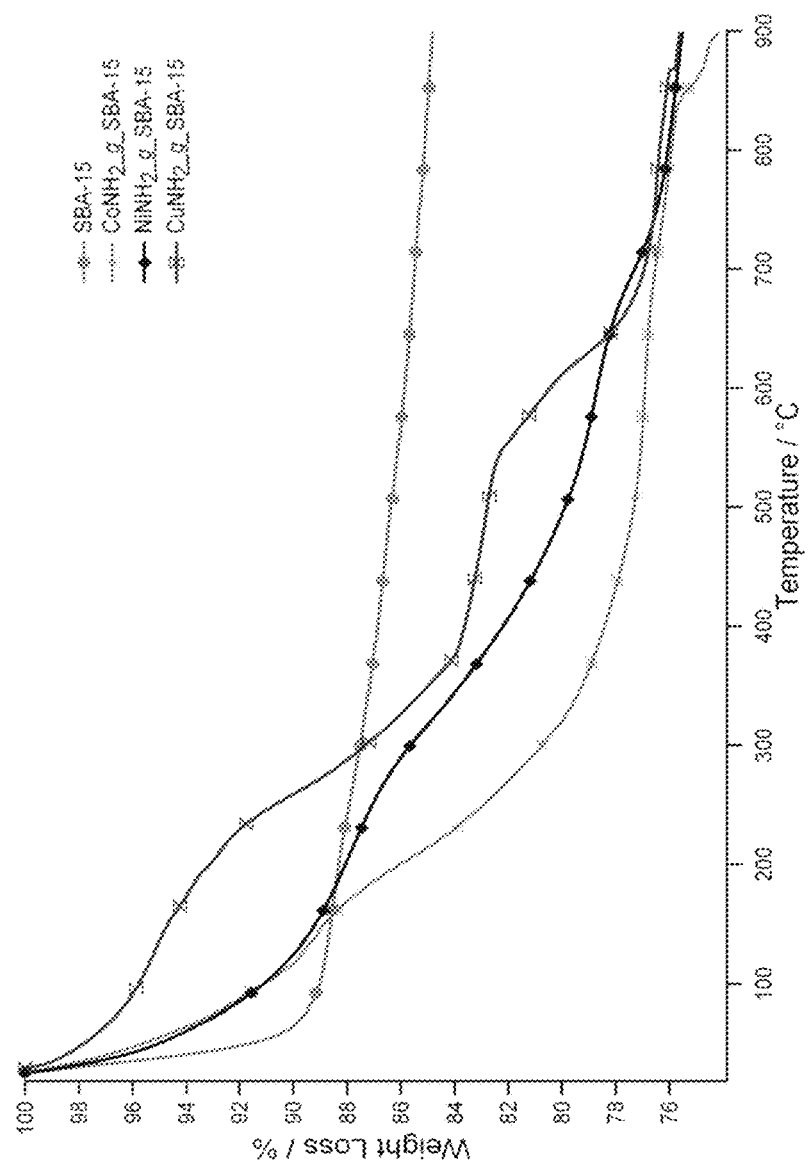
FIG. 5 shows Thermal gravimetric analyses data according to the present invention.

The TGA weight loss profiles for SBA-15 and the metal modified materials are shown in FIG. 5. This technique provides information about thermal stability, weakly adsorbed water, and the amount of amino-organic immobilized on the surface. For SBA-15, a loss in mass is observed from room temperature to 120° C. corresponding to the loss of weakly physisorbed water (11%). Additional losses of 3% (between 120-600° C.) and 1% (between 600-800° C.) may be attributed to small traces of the organic template used during the synthesis procedure and the loss of OH groups due to the formation of siloxane bridges, respectively. Our SBA-15 materials were calcined at 500° C., which is well below the temperature range required for loss of hydroxyl groups and therefore minimizing loss of anchorage points during grafting.

The TGA profiles of the metal modified materials exhibited particular weigh loss characteristics. For instance, the CoNH$_2$_g_SBA-15 profile shows a sharp weight loss of 7% at ca. 137° C. probably attributed to the presence of interatomic water that is complexed in the metal sites. Such hypothesis comes from comparison with the TGA data obtained for SBA-15, in which the peak water desorption temperature was nearly 20° lower. The two other weight loss regions observed for the CoNH$_2$_g_SBA-15 samples are attributed to the decomposition of the amino-organic groups from the pore surface and the loss of OH groups. As shown in Table 3, the calculated loadings for the amino-organic moieties based on TGA were between 1.96 and 2.50 mmol/g. These overall values do not match with the calculated theoretical monolayer value of 4 mmol/g, indicating this, among other things, that the substrate surface was probably lacking OH groups. Grafting of the moieties is highly dependant on the OH concentration on SBA-15 surface and it has been reported before that typical calcined SBA-15 materials have OH concentrations of ca. 1.2 mmol/m$^2$ [50]. Assuming that such value is also representative of our SBA-15 sample (~$S_A$=870 m$^2$/g), then the expected net amount of OH groups is in the order of ca. 1 mmol/g. Such small surface OH concentration could explain the observed same order, low amino-organic loadings, resulting also in few anchored and loosely bound species.

Sorbents Single-Component Adsorption Performance.

Figure 6:
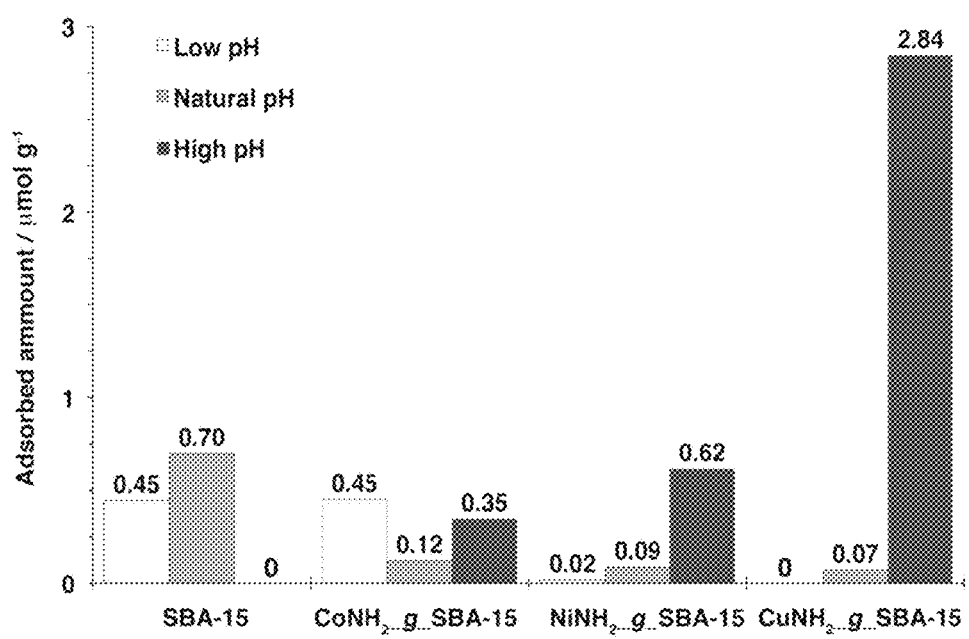
FIG. 6 shows a graph illustrating Adsorption capacities for the removal of Naproxen (Ci=14 ppm) from water at 25° C. according to the present invention.

Single point adsorption experiments were used to understand the effect of metal incorporation and pH conditions on the adsorption of Naproxen at 25° C. from water using an initial concentration of 14 ppm. It is evident from FIG. 6 that the adsorption capacities are influenced significantly by the pH of the initial solution and the type of metal incorporated. For SBA-15, no adsorption was observed at high pH conditions and the obtained adsorption capacities are 0.45 and 0.69 mmol/g for low and neutral pH, respectively. These adsorption capacities can be attributed to the presence of acid sites on SBA-15 due to the surface OH groups.

For the metal-modified materials, low and neutral pH conditions do not seem to improve adsorption capacities towards Naproxen when compared to the results obtained with SBA-15. However, a general trend can be observed for pH=13 tests where adsorption performance follow the order Cu $NH_2$_g_SBA-15>Ni $NH_2$_g_SBA-15>Co $NH_2$_g_SBA-15. At pH values higher than the $pK_a$ of polar compounds such as Naproxen (pKa~4), the molecule is mostly present in solution in ionic form due to the loss of $H^+$, as shown by Figure (Scheme 3). These electronic changes generate an additional electron donor site on Naproxen. It is suggested here that a metal complex is created by the donation of available π-electrons from the donor site to the electron acceptor σ-orbital of the metal ion. Depending on the strength of the complex, the metal could back-donate d-orbital atoms to Naproxen that is consequently electron deficient due to the initial donation. The probability of back-donation will increase with the higher available number of electrons on the d-orbital of the metal ions. In other words, following the order $Cu^{2+}>Ni^{2+}>Co^{2+}$, which matches well with the observed uptake data. Moreover, the maximum Naproxen uptake was obtained for $CuNH_2$_g_SBA-15 and was accompanied by a sorbent color change typical of complex formation (see Table 1). In general, these results suggest that the adsorption of Naproxen occurs by means of metal complexation based interactions, but further studies are considered necessary to evaluate the definite valence state of the anchored metals (e.g., XPS) to verify such hypothesis. Further characterization of the best sorbent candidate together with Molecular Orbital (MO) theory calculations could help to elucidate the nature of the adsorption interactions.

Compositional analysis obtained for the metal-modified materials revealed that the loading of the metal might be an important factor in their corresponding adsorption performance. For instance, results obtained by EDX showed that the highest metal loading on the siliceous support was obtained for $CuNH_2$_g_SBA-15 followed by Co and Ni-modified materials. In addition, even though all the sorbent variants appeared to retain their structural order, the last two materials were found to have the highest decrease in textural properties, which also correlates well with their low adsorption capacities. In general, the incorporation of copper complexes onto the surface of SBA-15 using grafting technique seems to result in a potential sorbent for the removal of Naproxen-like PPCPs from water. However, tests with water samples that include other typical contaminants is in order.

One important aspect of designing sorbents to remediate problems such as the removal of PPCPs is the ease of regeneration. Although mesoporous materials are thermally stable, a combustion process is out of the question here given the presence of metal-organic complexes. Based on FIG. 6, however, it is evident that one possible way of achieving regeneration would be a pH swing. For example, the copper-based sorbents excelled adsorbing Naproxen at alkaline conditions but not performed well at lower pH conditions. Implementation of a pH swing in a process is rather simple, probably requiring an acid sorbent flush stage to achieve full regeneration.

CONCLUSIONS

This invention evidences that the incorporation of transition metals onto the surface of SBA-15 using grafting techniques could become a potential strategy for the bottom-up design of new sorbent for the removal of low-concentration of Naproxen-like pharmaceutical drugs from water sources. At alkaline conditions, copper modified SBA-15 seems to be more effective for the removal of Naproxen when compared to the other tested sorbents. This enhanced adsorption may be attributed to the metal complexation of Naproxen with the copper ions.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

We claim:

1. An absorbent material for selectively removing pharmaceutical and personal care products containing aromatic rings from water comprising:
   a SBA-15 mesoporous silica material; and
   a transition metal grafted onto the surface of said SBA-15 mesoporous silica by chemically incorporating amino-organic moieties onto said SBA-15 mesoporous silica material and mixing said amino-organic functionalized SBA-15 mesoporous silica material with a solution of $M^{2+}$ sulfate, where M=Cu, said transition metal is anchored to the amino-organic moieties by complexation interactions with the aromatic rings of said pharmaceutical and personal care products, producing transition metal modified amino-organic functionalized SBA-15 mesoporous silica material, wherein the Cu modified amino-organic functionalized SBA-15 mesoporous silica material is in an alkaline condition for effectively removing said pharmaceutical and personal care products from water.

* * * * *